(12) United States Patent
Bernardini et al.

(10) Patent No.: US 10,100,799 B2
(45) Date of Patent: Oct. 16, 2018

(54) PROCESS FOR MANAGING THE RE-START OF AN INTERNAL COMBUSTION ENGINE IN A START AND STOP SYSTEM

(71) Applicant: Piaggio & C. S.p.A, Pontedera (PI) (IT)

(72) Inventors: Roberto Bernardini, Pontedera (IT); Jury Cantini, Pontedera (IT); Jeanpaul Milani, Pontedera (IT)

(73) Assignee: PIAGGIO & C. S.P.A., Pontedera (PI) (IT)

( * ) Notice: Subject to any disclaimer, the term of this patent is extended or adjusted under 35 U.S.C. 154(b) by 0 days.

(21) Appl. No.: 15/749,353

(22) PCT Filed: Jul. 29, 2016

(86) PCT No.: PCT/EP2016/068191
§ 371 (c)(1),
(2) Date: Jan. 31, 2018

(87) PCT Pub. No.: WO2017/021315
PCT Pub. Date: Feb. 9, 2017

(65) Prior Publication Data
US 2018/0223787 A1 Aug. 9, 2018

(30) Foreign Application Priority Data
Aug. 3, 2015 (IT) .......................... 102015000041504

(51) Int. Cl.
*F02N 11/08* (2006.01)
*F02N 19/00* (2010.01)
(Continued)

(52) U.S. Cl.
CPC ........ *F02N 11/0844* (2013.01); *F02N 19/005* (2013.01); *F02B 75/16* (2013.01);
(Continued)

(58) Field of Classification Search
CPC .............. F02N 11/0844; F02N 19/005; F02N 2019/007; F02N 2019/008
(Continued)

(56) References Cited

U.S. PATENT DOCUMENTS 5,458,098 A 10/1995 Yagi et al.
5,713,320 A 2/1998 Pfaff et al.
(Continued)

FOREIGN PATENT DOCUMENTS

EP 1046813 A1 10/2000
EP 1055816 A1 11/2000
(Continued)

*Primary Examiner* — Erick Solis
(74) *Attorney, Agent, or Firm* — Volpe and Koenig, P.C.

(57) ABSTRACT

A process for managing the re-start of an internal combustion engine in a Start and Stop system using an electric motor managed by an electric motor control unit (EMU), a first step of direct evaluation of the rotation regime of the crankshaft being provided by an internal combustion engine control unit (ECU) through a sensor put on the crankshaft: if the rotation regime is above a threshold corresponding to the sensor accuracy loss, in case of re-opening of the throttle valve said control unit of the combustion engine (ECU) continues to provide fuel and ignition; otherwise a crankshaft positioning step is provided by the electric motor control unit (EMU) comprising: a forward crankshaft rotation by a predetermined forward rotation angle; a detection of a possible piston stall state followed, in negative case, by an additional forward crankshaft rotation until reaching a maximum predetermined forward rotation angle; an inverse crankshaft rotation by a predetermined angle; and a detection of a possible piston stall state followed, in negative case, by an additional inverse crankshaft rotation until reaching a maximum predetermined inverse rotation angle.

11 Claims, 4 Drawing Sheets

(51) Int. Cl.
*F02B 75/16* (2006.01)
*F02B 75/02* (2006.01)

(52) U.S. Cl.
CPC ... *F02B 2075/027* (2013.01); *F02N 2019/007* (2013.01); *F02N 2019/008* (2013.01); *F02N 2200/021* (2013.01); *F02N 2200/044* (2013.01); *Y02T 10/48* (2013.01)

(58) Field of Classification Search
USPC ..................................... 123/179.4
See application file for complete search history.

(56) References Cited

U.S. PATENT DOCUMENTS

| | | | |
|---|---|---|---|
| 6,840,203 B2* | 1/2005 | Wakitani | F02N 11/0848 123/179.25 |
| 6,877,470 B2 | 4/2005 | Mitani et al. | |
| 7,105,944 B2* | 9/2006 | Wakitani | F02N 11/04 307/10.6 |
| 8,573,173 B2* | 11/2013 | Garrard | H02P 6/22 123/179.3 |
| 9,074,529 B2* | 7/2015 | Kawasumi | F02B 75/02 |

FOREIGN PATENT DOCUMENTS

| | | |
|---|---|---|
| EP | 1233175 A1 | 8/2002 |
| EP | 1321666 A1 | 6/2003 |
| EP | 1365145 A2 | 11/2003 |
| EP | 1375907 A2 | 1/2004 |
| EP | 1406010 A2 | 4/2004 |
| WO | 0017496 A2 | 3/2000 |

\* cited by examiner

PROCESS FOR MANAGING THE RE-START OF AN INTERNAL COMBUSTION ENGINE IN A START AND STOP SYSTEM

The present invention relates to a process for managing the re-start of an internal combustion engine in a Start and Stop system, namely a single cylinder engine, using an electric motor acting on the crankshaft of the internal combustion engine and managed by an electric motor control unit (EMU).

This process is particularly advantageous for performing the starting procedure in engines wherein the automatic switching-off of the engine is provided when the vehicle is still, and preferably it is suitable for single-cylinder engines for motor vehicles such as scooters and the like, wherein the electric motor, which obviously acts even as generator, is mounted directly on the crankshaft.

This type of engines by now is widely known under the term Start and Stop engine.

In this configuration, one tries to optimize the sizes and the torque which the electric motor has to be able to exert in order to carry out the functions thereof.

To this regard, when the engine has to be re-started, that is when the engine switches-off as the vehicle has stopped, a re-starting procedure is used providing the rotation of the electric motor to place the piston, inside the cylinder, in the position requesting the lowest possible torque for the re-start, by considering that the latter has to take place during a very short instant, absolutely by avoiding the piston stall inside the cylinder.

European patent application No. 1,406,010 A2 discloses an engine starting control device wherein the rotation state of the crankshaft is detected through costly sensors put on the electric motor, connected both to the electric motor control unit (EMU) and to the internal combustion engine control unit (ECU). This step may be burdensome in terms of required connections inside the starting system and requires a large computation power.

U.S. Pat. No. 5,458,098 A describes a procedure of this type, devised for multi-cylinder engines of automobile type.

Generally, the electric motor in this step is rotated with a limited torque therefore the piston cannot exceed the top dead centre corresponding to the compression step, both rotating the crankshaft forward and backward.

In the above-mentioned document, at each stop a rotation backward is performed, said inverse rotation to move away the pistons from the respective nearer compression step: from that moment on the electric motor is rotated forward for the starting, the kinetic energy which is accumulated during the forward rotation allows overcoming the nearer compression step by re-starting the engine, even if the torque would not be sufficient to overcome it by starting from a more approached step.

The inverse rotation is performed for a pre-established rotation angle ($\pi/4$ in case of a four-cylinder engine wherein there is a compression step every $\pi/2$ of rotation) or for a pre-established rotation time, provided that the piston does not lock the inverse rotation before.

However, in a single-cylinder engine, the adjacent compression steps are distant therebetween, in terms of rotation angle by an angle of $2\pi$, and it is then difficult to establish a fixed angle and/or inverse rotation time to be sure of performing the re-starting.

Even in U.S. Pat. No. 5,713,320 A, a procedure similar to the previous one is described, wherein the electric motor is rotated inversely with low power, until reaching the nearer compression step.

European patent No. 1,046,813 describes an inverse rotation procedure, wherein the intervention of a sensor detecting the friction during thereof is provided, to understand when the inverse rotation can cease.

However, it is to be noted that this kind of sensor forcedly has to be an additional component of the ignition system, and an extra resource to be managed.

On the contrary, European patent No. 1,233,175 describes a procedure using a sensor capable of detecting the absolute angular position of the crankshaft, therefor the comment of the previous document is valid.

Analogously, European patent No. 1,321,666 describes a procedure wherein the inverse rotation angle applied to the crankshaft is detected.

The procedure of European patent application No. 1,365,145 is analogous to those described in the mentioned documents.

In the procedure of European patent No. 1,375,907 the speed of the crankshaft, instead the position thereof, is detected to understand when the inverse rotation is to be interrupted, thus requesting the presence of an additional sensor.

U.S. Pat. No. 6,877,470 describes instead a procedure wherein the inverse rotation is preceded by a forward rotation as far as the compression step, exactly to be able to use a finished quantity of inverse rotation. However, this procedure is thought for the automobile field wherein there are small rotations and high torques.

European patent application No. 1,055,816 A1 describes a procedure wherein the positioning has to be made by knowing the angular position of the engine with high precision, in order to be able to perform a re-start.

It is to be noted that these re-starting processes are however exposed even to the inner inertia of the engine, in case the re-start is decided by the driver before completing the switching-off, that is when the engine keeps a rotation regime.

In this case, it has to be noted that a normal rpm sensor arranged on the engine crankshaft provides a signal which loses definition below a certain predetermined threshold, which depends upon the quality of the used sensor.

This accuracy loss prevents from evaluating exactly when the engine, without requiring to complete the switching-off procedure, can re-start by pure inertia or because the control unit of the ECU engine continues to provide it mixture of fuel and ignition.

Without considering this piece of data, upon-reopening the throttle valve when the engine has not yet been stopped, it is necessary however to stop completely the engine and to re-start it, a procedure which could involve time waste which would be perceived negatively by the driver.

The technical problem underlying the present invention consists in providing an ignition process allowing to overcome the drawbacks mentioned with reference to the known art.

Such problem is solved by a starting process as specified above, and defined in appended claim 1.

The main advantage of the starting process according to the present invention consists in allowing a guaranteed start even by using an electric motor optimized in terms of maximum torque and sizes, and relying on a simple speed sensor put on the crankshaft, the internal combustion engine control unit not being connected to the sensors of the electric motor control unit.

In fact, both the starting position of the inverse rotation and the end position are determined by the subsequent satisfying of at least one of the following two conditions:

one relating the possible reached piston stall and the other one the implementation of a maximum rotation angle.

A piston stall is meant to be a stall determined when a piston of the internal combustion engine reaches a compression phase which cannot be overcome by the electric motor, close both to the top and to the bottom dead centre of the piston stroke.

As it will be clear from the following, in order to manage the forward and the backward (inverse) rotations, it is not necessary the use of an additional sensor by the control unit of the electric motor EMU. The values of predetermined forward and invers rotation angles are stored within the electric motor control unit (EMU) of the electric motor.

The present invention will be described hereinafter according to a preferred embodiment, provided by way of example and not for limitative purposes, by referring to the annexed drawings wherein.

Figure 1:
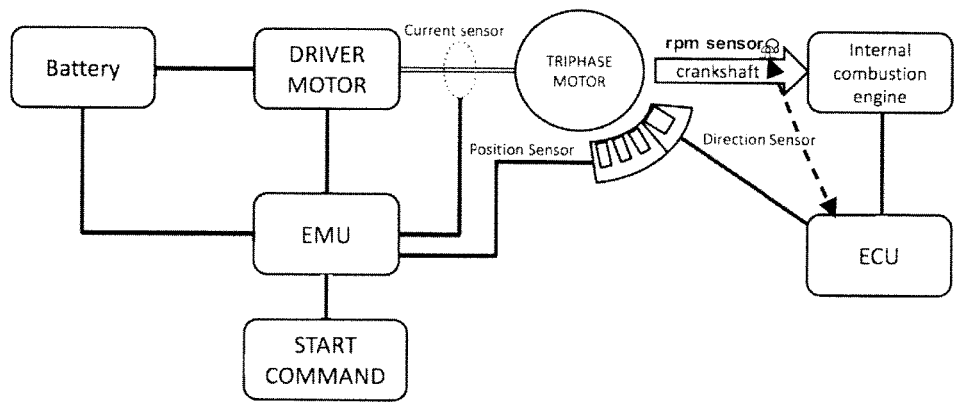
FIG. 1 shows a scheme of an ignition system which performs the starting process according to the present invention.

By referring to FIG. 1, an ignition system is represented apt to perform the starting process according to the present embodiment example, provided for a single-cylinder internal combustion engine.

It comprises a three-phase electric motor, of the brushless type with permanent magnets (THREE-PHASE MACHINE) which is driven by an actuation (MOTOR DRIVER) which in turn receives electric current by a Battery.

Both the actuation and the battery are managed by a control unit of the electric motor (EMU) arranged to receive an engine ignition command by a suitable input (START COMMAND). In the specific case, this input can receive a signal generated by a button, by the rotation of a key, by the opening of a throttle valve of the fuel supply system deriving from an accelerator, the shifting or the detection of a start signal exerted by the driver on the command, pedal or knob, accelerator and so on.

The last two types of start signal are those used in case of an engine and an ignition system arranged to switch-off the engine upon each vehicle stop, or upon each stop beyond a certain duration, in order to re-ignite it automatically when the driver shows the intention to resume driving as if the engine had not been previously stopped.

The control unit of the electric motor (EMU) receives data related to the current supply to the electric motor by one or more suitable electric sensors (Current sensor); it further receives pulses which are representative of the relative position of the rotor of the electric motor with respect to the stator.

In the present embodiment, such pulses are phase pulses generated by phase sensors of the stator of the electric motor (Position sensor), that is the three sensors with Hall effect therewith the stator is equipped.

The electric motor is mechanically connected to the Internal combustion engine directly by means of the crankshaft which coincides with the shaft of the electric motor.

Furthermore, the stator of the electric motor is also equipped with a particular sensor providing a signal representing the rotation direction of the rotor with respect to the stator.

Such signal, for example generate by a sensor comprising two sub-sensors with Hall effect, is not connected to the control unit of the electric motor, but to a control unit of the internal combustion engine (ECU) regulating the power supply of the internal combustion engine, that is the spark plugs, and the supply of the fuel mixture.

At last, on the CRANKSHAFT a RPM SENSOR is arranged detecting directly the shaft rotation regime and providing it to the control unit of the internal combustion engine (ECU).

By referring to the present embodiment example, such ignition system is arranged for a four-stroke single-cylinder engine of substantially motorcycle type.

Figure 2:
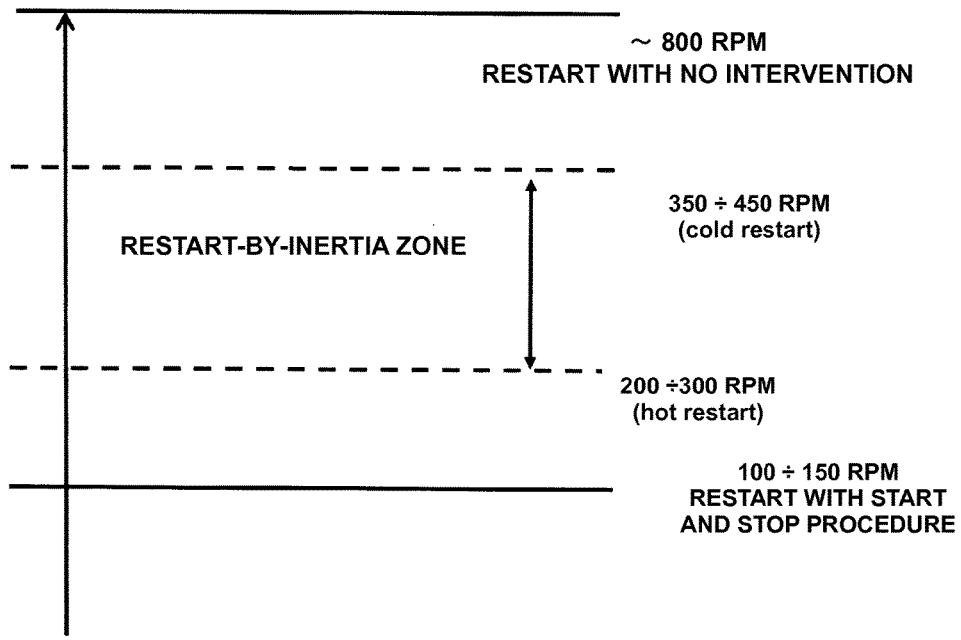
FIG. 2 illustrates a re-start logic based upon the determination of the rotation regime of the crankshaft.

By referring to FIG. 2, the re-starting procedure provides a direct evaluation of the rotation regime of the crankshaft: a first threshold of the rotation regime of the crankshaft is established, beyond thereof, in case of re-opening of the throttle valve of the engine, the engine continues to remain switched-on by pure inertia; furthermore a second threshold is established, below thereof the engine will perform a switching-off and re-starting procedure which will be detailed hereinafter.

Between the above-mentioned thresholds, which for a normal engine are equal to about 800 rpm (first threshold) and to 100-150 rpm (second threshold), in case of re-opening of the throttle valve of the engine, the control unit of the internal combustion engine (ECU) imposes both the injection of fuel and the ignition of the spark plugs, so that the engine can re-start quickly, without a procedure of complete switching-off and re-starting.

The second threshold depends upon when the signal provided by the sensor (RPM SENSOR), arranged on the crankshaft and connected to the internal combustion engine control unit (ECU), loses accuracy and it is set based upon this evaluation.

In this way, it is possible to re-start directly the engine without requiring to connect the control unit of the internal combustion engine (ECU) to more complex sensors than the sensor on the crankshaft.

Then, in the present process, a first step of direct evaluation of the rotation regime of the crankshaft is provided based upon the above-mentioned predetermined threshold depending upon the rpm sensor used on the crankshaft: if the rotation regime is above such predetermined threshold, in case of re-opening of the throttle valve a control unit of the combustion engine (ECU) continues to provide fuel and ignition to the engine.

Figure 5:
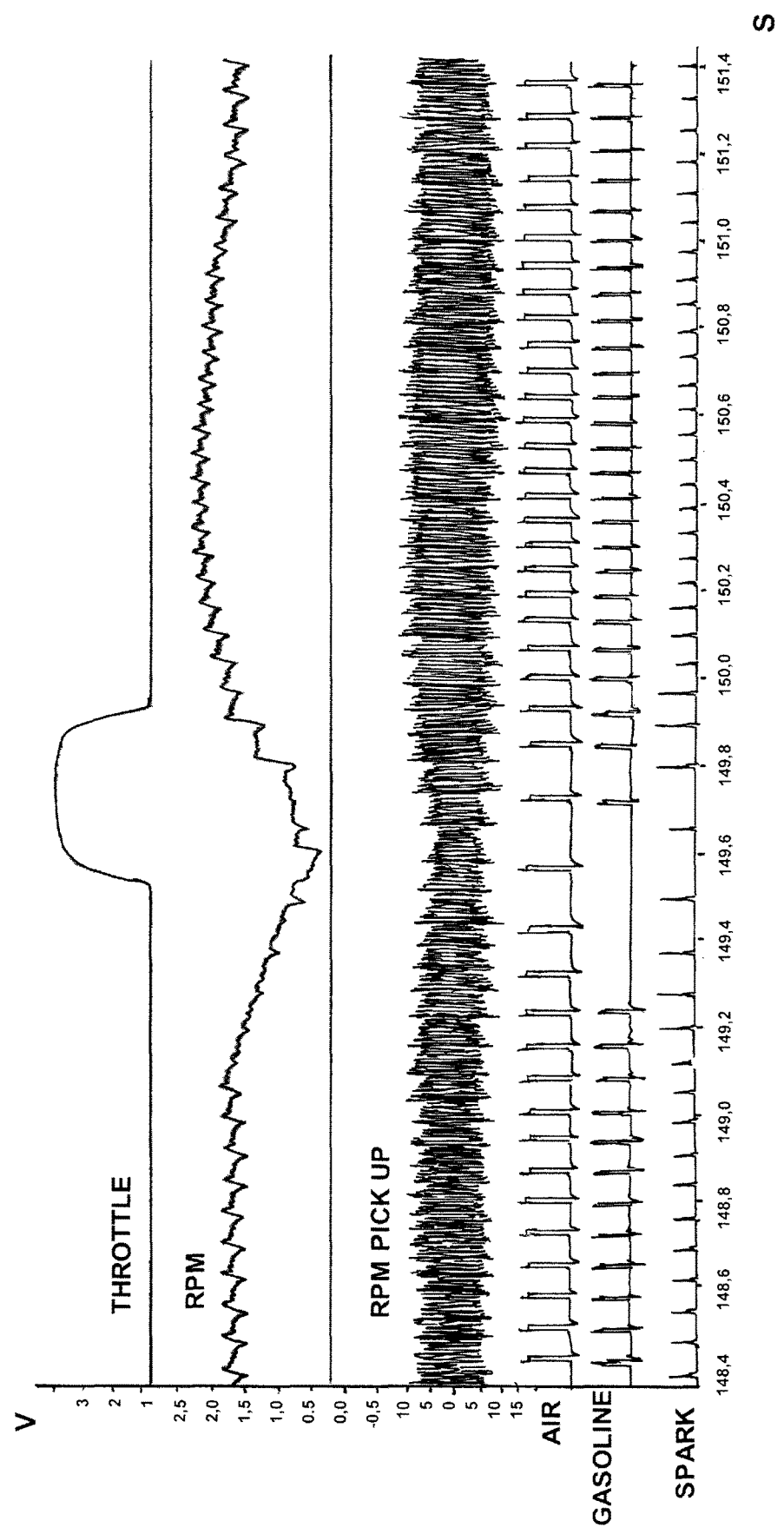
FIG. 5 shows a diagram of the operating parameters of an engine during a re-start upon critical rotation regime.

By referring to FIG. 5, the first trace from the top (THROTTLE) represents the position of the throttle valve which, when it is open, determines a command for re-starting the engine which was going to be switched-off (approximately the opening takes place at the instant 149.5)

The second trace from the top represents the rotation regime of the crankshaft detected by a sensor directly thereon (RPM); said predetermined threshold, which depends upon the sensor, which in this case is 150 rpm, is also represented by a solid line.

The third trace from the top represents the definition of the signal coming from the sensor (RPM PICK UP).

The fourth trace from the top represents the command of the minimum air valve (AIR).

The fifth trace from the top represents the gasoline injection (GASOLINE).

The sixth trace from the top represents the spark actuation (SPARK).

The rpm sensor is used to let the internal combustion engine control unit (ECU) know the position of the crankshaft, and therefore the step is of purely passive type, therefore when the crankshaft speed goes below a predetermined threshold, preferably not higher than 150 rpm, there is no more enough flow variation therefore the produced signal is no more considered reliable, and the loss of synchronism in the commands provided by the control unit of the internal combustion engine (ECU) could follow.

Therefore, in the starting step, starting from zero speed of the crankshaft, it should exceed 150 rpm before reconstructing the synchronism and trying to start correctly the engine. This translates into an increase in the time necessary to start the thermal engine.

This strategy then provides that, if during the step of switching-off the engine a request of a new start is received, the engine control (ECU) interrupts the switching-off procedure and it drives again the thermal engine if the revolution threshold has remained above 150 rpm, and doing so all the time necessary to reconstruct the synchronism starting from the null speed is saved.

In the diagram it is noted that, at the instant 149.0, the gasoline signal goes to zero (fifth trace) which underlines the request for stopping the engine; at the instant 149.5 the user shows the intention of re-starting by opening the throttle valve, and the engine control (ECU) realizes that the rotation regime of the crankshaft is still above the pre-set threshold, that is 150 rpm, therefore the injector is driven again and the engine re-starts immediately as the synchronism has never been lost.

In the contrary case, a switching-off and starting procedure is performed, in particular, a first positioning step is detailed hereinafter, which takes place after the engine switching-off by the electric motor control unit (EMU), that is the whole stop of the vehicle.

Such positioning step comprises a first forward rotation of the electric motor by a first predetermined forward rotation angle. This rotation approaches the piston of the internal combustion engine to the subsequent compression step thereof, ideally by a rotation angle comprised between 0° and 720°.

The first predetermined angle of said first forward rotation could be comprised between 350° and 700°, preferably 550°.

If during this rotation the electric motor stops because the piston reached reaches a piston stall position, that is if the piston reaches the compression step, the control unit of the electric motor (EMU) detects that piston stall through the electric motor behaviour, i.e. by means of the current intensity sensor or by counting the phase pulses which would interrupt prematurely, and at this point the electric motor is ready to be controlled in inverse rotation.

In the negative case, if the possible piston stall state is not detected, the electric motor is controlled by the control unit thereof (EMU) in an additional forward rotation until it reaches a maximum predetermined forward rotation angle, at which the electric motor stops.

Such maximum forward rotation angle is determined by a number N of phase pulses detected by said phase sensors. The selection of the number N of pulses is made to guarantee a rotation angle so as to meet certainly the forward compression step.

Preferably N is comprised between 35 e 70, for example it is equal to 55.

Upon satisfying this second condition, the positioning step comprises an inverse rotation, which takes place in a way analogous to those described for the forward rotation.

Beforehand a first inverse rotation of a first predetermined inverse rotation angle, preferably comprised between 350° and 700°, for example 550°, is performed; if a piston stall state is reached, detected by the control unit of the electric motor (EMU) as previously described, then the electric motor is ready for a subsequent ignition step.

In the negative case, that is if the piston stall is not detected, the electric motor is controlled by the control unit thereof (EMU) in an additional inverse rotation until reaching a maximum predetermined inverse rotation angle.

Again, such maximum inverse rotation angle corresponds to a number M of phase pulses detected by said phase sensors, so as to guarantee the stall. Preferably M is comprised between 35 and 70, for example 55.

Figure 3:
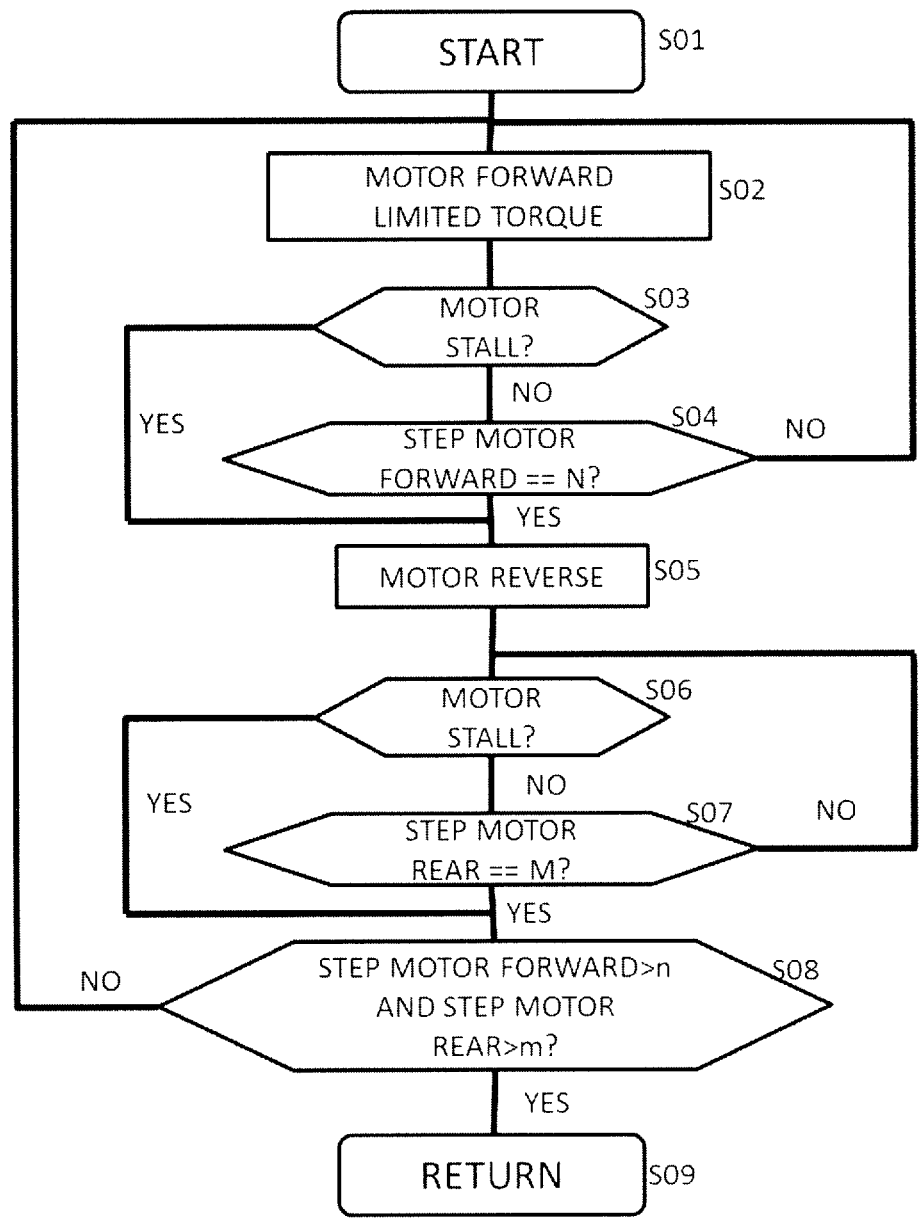
FIG. 3 shows a block diagram illustrating the positioning strategy in the start process according to the present invention.
Figure 4:
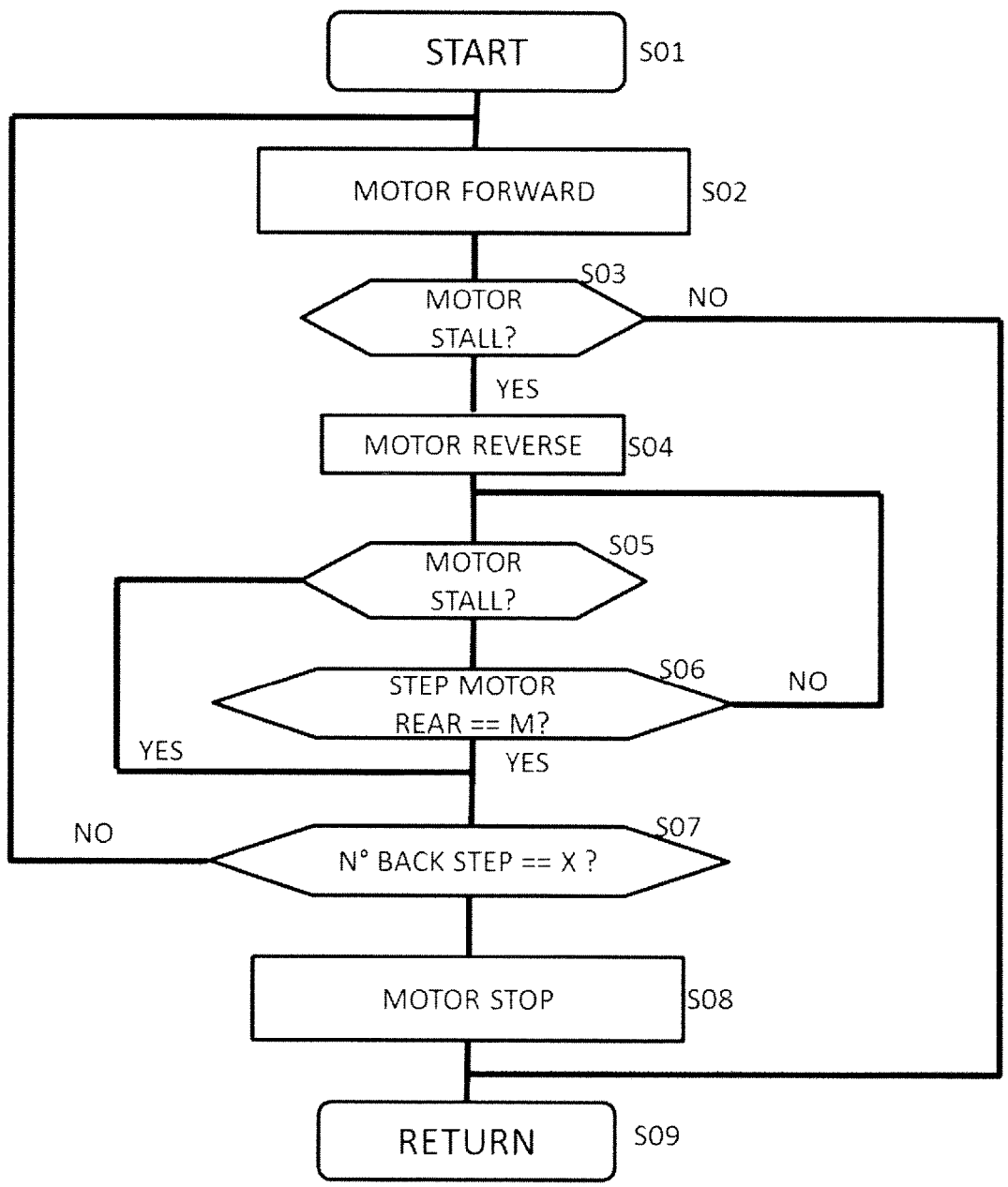
FIG. 4 shows a block diagram illustrating an ignition strategy in the re-start process according to the present invention.

Upon satisfying this second condition, the positioning step is ended and the ignition system is ready to perform the subsequent ignition step (FIG. 3).

Even the ignition step follows modes similar to those described previously.

First of all, the electric motor is controlled forward, by actuating it at the maximum torque, condition which in the previous rotations was not strictly necessary.

If the positioning performed previously is correct and if all other surrounding conditions allow it, the engine switches on by overcoming the subsequent compression step.

It is to be noted that in this step, the control unit of the internal combustion engine (ECU), based upon the signal received by the direction sensor, authorizes the ignition of the spark plugs and the supply of the mixture, without this information being managed by the control unit of the electric motor.

If the engine did not switch on, then one would be in a state of additional stall. In this case, the positioning procedure is repeated by means of the only inverse rotation described previously for the positioning step.

It is to be noted that, during this inverse rotation, the ignition of the spark plug and the supply of mixture is however hindered, even upon the possible reaching of a compression step, directly by the control unit of the internal combustion engine (ECU), by means of the signal received by said direction sensor.

At the end of the inverse rotation, which can even be performed for a second predetermined inverse rotation angle, the ignition step is performed again, and so on, until the ignition or the execution of a predetermined number X of attempts, at the end thereof the system will signal a failure situation.

To the above described process for starting an internal combustion engine a person skilled in the art, with the purpose of satisfying additional and contingent needs, could introduce several additional modifications and variants, all however within the protective scope of the present invention, as defined by the enclosed claims.

The invention claimed is:

1. A process for managing a re-start of an internal combustion engine in a Start and Stop system using an electric motor acting on a crankshaft of the internal combustion engine and managed by an electric motor control unit (EMU), a first step of direct evaluation of the rotation regime of the crankshaft being provided through a rpm sensor directly placed on the crankshaft and connected to a combustion engine control unit (ECU) of the internal combustion engine: if the rotation regime is above a predetermined threshold, in case of re-opening of the throttle valve a control unit of the combustion engine (ECU) continues to provide fuel and ignition to the engine; if the rotation regime is below said predetermined threshold a crankshaft positioning step and an ignition step are provided, activated after a starting command, said predetermined threshold corresponding to a signal accuracy loss of said rpm sensor, wherein said crankshaft positioning step by the electric motor control unit (EMU) comprises:

a forward crankshaft rotation by a predetermined forward rotation angle;

a detection of a possible piston stall state followed, in negative case, by an additional forward crankshaft rotation until reaching a maximum predetermined forward rotation angle;

an inverse crankshaft rotation by a predetermined angle; and a detection of a possible piston stall state followed, in negative case, by an additional inverse crankshaft rotation until reaching a maximum predetermined inverse rotation angle.

2. The process according to claim 1, wherein said predetermined threshold does not exceed 150 rpm.

3. The process according to claim 1, wherein said piston stall state is detected by a control unit of the engine (EMU) which receives data related to a current supply to the electric motor by an electric sensor.

4. The process according to claim 1, wherein said piston stall state is detected by a control unit of the engine (EMU) which receives a piece of information related to a number of phase pulses detected by phase sensors of a stator of the electric motor.

5. The process according to claim 1, wherein a stator of the electric motor is equipped with a sensor providing a signal representing a rotation direction of a rotor with respect to the stator which is sent to a control unit of the internal combustion engine (ECU) regulating fuel supply and ignition of the internal combustion engine.

6. The process according to claim 1, wherein said predetermined forward rotation angle of said first forward rotation is comprised between 350° and 700°.

7. The process according to claim 4, wherein said forward rotation maximum angle is determined by a number N of phase pulses detected by said phase sensors.

8. The process according to claim 1, wherein said predetermined inverse rotation angle of said first forward rotation is comprised between 350° and 700°.

9. The process according to claim 4, wherein said inverse rotation maximum angle is determined by a number M of phase pulses detected by said phase sensors.

10. The process according to claim 1, further comprising an ignition step providing a forward crankshaft rotation to determine the starting of the internal combustion engine.

11. The process according to claim 10, wherein, if the starting has not been implemented, the positioning procedure is repeated only by the inverse crankshaft rotation for the positioning step until ignition or execution of a predetermined number X of attempts, at the end thereof the system will signal a failure situation.

* * * * *